United States Patent [19]
Murai et al.

[11] Patent Number: 5,741,006
[45] Date of Patent: Apr. 21, 1998

[54] BUTTERFLY VALVE

[75] Inventors: Yoneo Murai, Gamo-gun; Masaharu Fukuchi, Kanzaki-gun, both of Japan

[73] Assignee: Okumura Engineering Corp., Shiga, Japan

[21] Appl. No.: 470,331

[22] Filed: Jun. 6, 1995

Related U.S. Application Data

[63] Continuation of Ser. No. 172,029, Dec. 22, 1993, abandoned.

[30] Foreign Application Priority Data

Dec. 1, 1993  [JP]  Japan .................... 5-301724

[51] Int. Cl.⁶ .................................................. F16K 1/22
[52] U.S. Cl. .............................. 251/305; 251/306
[58] Field of Search .............................. 251/305, 306

[56] References Cited

U.S. PATENT DOCUMENTS

| | | | |
|---|---|---|---|
| 3,680,833 | 8/1972 | McNeely, Jr. ............... | 251/305 X |
| 4,108,199 | 8/1978 | Bonafous ..................... | 251/306 X |
| 4,289,297 | 9/1981 | Nakanishi .................... | 251/306 |
| 4,605,201 | 8/1986 | Miyazaki ...................... | 251/306 X |

FOREIGN PATENT DOCUMENTS

| | | | |
|---|---|---|---|
| 1008975 | 5/1957 | Germany ..................... | 251/306 |
| 66582 | 3/1926 | Sweden ........................ | 251/306 |

*Primary Examiner*—John Fox
*Attorney, Agent, or Firm*—Koda and Androlia

[57] ABSTRACT

A butterfly valve comprised of main body, a seating ring installed in the seating ring, and a disk shape valve member rotatably provided in the seating ring. The seating ring has an inside projecting ridge so that circumferential edges of vanes of the valve member come into contact with the side edges of the projecting ridge when the valve member is closed. The outer circumferential surface of the valve member is formed spherically as a whole so that machinery cutting of the surfaces of the valve member can easily be accomplished by a lathe. The seating ring has shaft supporting portions formed in concave surfaces so as to conform to the spherical surface of the valve member. Two vanes of the valve member are located at point-symmetrical positions with respect to shaft receptacles which are provided on the axis line of the valve member and extended tangentially with respect to the shaft receptacles. Thus, chamfering on the circumferential edges of the vanes can easily be accomplished by machinery, and the circumferential edges are rounded by chamfering so as to prevent damages on the seating ring.

8 Claims, 6 Drawing Sheets

BUTTERFLY VALVE

This is a continuation of application Ser. No. 08/172,029, filed Dec. 22, 1993, now abandoned.

BACKGROUND OF THE INVENTION

1. Field of the Invention

The present invention relates to a valve and more particularly to a butterfly valve installed in a fluid flow path.

2. Prior Art

FIGS. 10 and 11 show a conventional butterfly valve.

This butterfly valve comprises a main body 1, a seating ring 2 mounted inside of the main body 1, and a disk-form valve member 4 having vanes 7. The valve member 4 is opened and closed by a rotatable valve shaft 3 which passes through shaft holes formed in the main body 1. The seating ring 2 has an inside projecting ridge 5 on its inner circumferential surface, and side edges 6 of the inside projecting ridge 5 of the seating ring 2 are used as pressure-contact sealing surfaces. In other words, the front and rear circumferential edges of the vanes 7 of the valve member 4 come into pressure-contact with the pressure-contact sealing surfaces.

Accordingly, the front and rear circumferential edges of the valve member 4 and the seating ring 2 are contacted with a minimal frictional force, and the seating ring 2 may have a long useful life. In addition, the opening and closing torque of the valve member 4 can be small.

In this conventional butterfly valve, the shaft cylinder 9, in which a shaft hole is formed so that the valve shaft 3 can pass through it, rotates about the valve shaft 3. Accordingly, the shaft cylinder 9 cannot be constructed so as to make a press contact with the side edges 6 of the inside projecting ridge 5. As a result, as shown in FIG. 11, the shaft cylinder 9 is obtained by cutting away upper portions of the valve member 4 in a half-moon shape, thus forming flat end surfaces, and the shaft supports 10 of the seating ring 2 are projected into this shaft cylinder 9, in the axial direction of the valve shaft 3, so that the shaft supports 10 press the shaft cylinder 9 in the axial direction of the shaft 3.

The valve member 4 is made of steel and is manufactured by casting, etc. In order to insure good sealing properties during the pressure contact with the seating ring 2, the outer circumferential surface S1 and the pressure-contact circumferential edge areas 11 and 12 of the valve member 4 are finished by cutting machineries.

However, as described above, in the conventional butterfly valve, the end surfaces of the shaft cylinder 9 are formed flat, and the outer circumferential surfaces of the vanes 7 on both sides of the shaft cylinder 9 are formed in a circular arc. Accordingly, when the cutting is performed via a lathe, the shaft cylinder 9 and the outer circumferential surfaces of the vanes 7 cannot be finished continuously.

As to the front and rear circumferential edges 11 and 12 of the vanes 7, these portions are chamfered in order to improve the sealing properties. However, as seen from FIG. 10, the vanes 7 are thinner than the shaft cylinder 9 and are formed on an imaginary line B which passes through the axial center of the shaft cylinder 9. Accordingly, the shaft cylinder 9 interferes with the machinery chamfering that is done on the circumferential edges of the vanes 7. Thus, the chamfer on at least the bordering areas 13 on the shaft cylinder 9 must be performed by hand.

Furthermore, since the chamfering involves flat cutting, the corners between the front and rear circumferential edges 11 and 12 and the outer circumferential surface S1 of the valve member 4 become angular. If these corner sections come into contact with the seating ring 2 and are pressed by the fluid, there is a danger that the seating ring 2 will be damaged.

SUMMARY OF THE INVENTION

Accordingly, the object of the present invention is to provide a butterfly valve that includes a valve member which provides improved sealing properties together with a seating ring.

It is another object of the present invention to provide a butterfly valve that includes a valve member which has outer circumferential surfaces that can be easily finished by cutting machineries.

It is still another object of the present invention to provide a butterfly valve in which fluid resistance can be kept at a minimum level.

It is still another object of the present invention to provide a butterfly valve in which the chamfering on the circumferential edges of the valve member can be performed by machineries and in which damage to the seating ring that might be caused by the valve member is prevented.

In order to accomplish the object, in the butterfly valve of the present invention, the outer circumference of the valve member, including the areas where shaft receptacles for valve shafts are formed, has a spherical surface.

More specifically, the butterfly valve of the present invention essentially comprises a main body, a seating ring mounted on the inside of the main body, and a valve member which is installed inside the seating ring and opened and closed via valve shafts that are provided in the main body, and the unique structure in this butterfly valve is that the side edges of an inside projecting ridge formed on the inner surface of the seating ring are used as pressure-contact sealing surfaces in contact with the circumferential edges of the valve member, the valve member is roughly in a circular disk shape with the outer circumference having a spherical surface, and shaft supporting portions of the seating ring for supporting valve shafts have concave surfaces so as to conform to the spherical surface of the valve member.

In the above, the valve member is thin except for the upper and lower portions where shaft receptacles are provided. Thus, the fluid resistance can be kept to a minimum level when the valve member is opened during the use.

More specifically, the valve member includes, at the top and bottom, the shaft receptacles and two vanes that are provided on both sides of the shaft receptacles. The two vanes are at in point-symmetrical positions with respect to the shaft receptacles and extend tangentially with respect to the front and back outer circumferential surfaces of the shaft receptacles. In addition, the circumferential edges of the vanes which come into a pressure contact with the pressure-contact sealing surfaces of the seating ring are chamfered. In this case, the circumferential edges of the vanes can be rounded.

Furthermore, the valve member is formed in a true circle shape as a whole, and such a valve member is used in the butterfly valve in which the side edges of the projecting ridges of the seating come into contact with the circumferential edges of the valve member. Accordingly, the cutting of the outer circumference of the valve member of the present invention can be performed continuously by a lathe.

In the meantime, the shaft receptacles of the valve member are rotated about the valve shafts. Thus, the valve member cannot be designed so that the valve receptacles come into pressure contact with the edges of the projecting ridges of the sealing seat. As a result, it is necessary to design so that the shaft supporting portions provided in the seating ring are pushed inwardly in the radial direction of the valve member.

In this case, if the outer circumferential surface of the shaft receptacle of the valve member is formed flat, then the shaft supporting portions of the seating ring and the shaft receptacles of the valve member come into a point contact relationship when viewed from the direction of the flow of a fluid. Thus, there are problems in terms of sealing properties. In order to improve the sealing properties, it is necessary to increase the height of the inside projecting ridge at points where the shaft supporting portions are formed in the seat ring so that the pressing contact force against the valve member can increase. However, if the seating ring is designed in this manner, the force required in opening and closing the valve member needs to be high, and there is danger that the seating ring may be damaged by the valve member.

As a result, in the present invention, the valve member is, including its shaft receptacles, shaped spherical as a whole, and the shaft supporting portions of the seating ring is curved inwardly so as to conform with the spherical shape valve member. Thus, the contact area between the shaft receptacles of the valve member and the shaft supporting portions of the seating ring is increased, and as a result, the sealing properties can be improved without increasing the height of the inside projecting ridge of the seating ring.

In addition, damage to the boundary areas defined by the pressure-contact sealing surfaces and the shaft supporting portions of the seating ring that is caused by the rotation of the valve member can be prevented. Accordingly, the height of the inside projecting ridge of the seating ring may have good sealing properties even if the vanes and the shaft receptacles of the valve member are set to be the same in height. In addition, the manufacture of the seating ring can be easy.

However, regarding the inside projecting ridge of the seating ring, the direction of pressing contact by the fluid differs. In other words, the fluid pressure on the vane-contact portions of the projecting ridge (which are contacted by the circumferential edges of the valve member) and the fluid pressure on the shaft supporting portions of the projecting ridge (which are contacted by the shaft receptacles of the valve member) are not the same. Accordingly, in order to obtain a low-torque opening and closing rotation of the valve member about the valve shafts, it is necessary that the inside projecting ridge has the height that can allow the rotation of the valve member in the boundary areas that are defined by the vane-contact portions and shaft supporting portions.

In addition, the height of the side edges of the inside projecting ridge located on the inside with respect to the direction of rotation of the valve member must be set at a value that can allow the rotation of the valve member. Of course, sealing properties are also required in these boundary areas. Accordingly, the areas of the inside projecting ridge where the boundary areas are located, it is desirable that the height of the side edges located outside of the direction of rotation of the valve member is the same as the height of the outer circumferential edges of the vane-contact portions and the shaft supporting portions.

Meanwhile, as described above, the valve member is a thin element as a whole except for the shaft receptacle areas so that the fluid resistance of the valve member can be a minimum when the valve member is fully opened. In addition, the vanes are located at point-symmetrical positions centered on the shaft receptacles and extended tangentially with respect to the front and back circumferential surfaces of the shaft receptacles. As a result, the front and rear circumferential edges of the vanes which come into pressure contact with the pressure-contact sealing surfaces of the seating ring are flat and parallel to each other when viewed in axial direction of the valve shafts.

Accordingly, when chamfering on the circumferential edges of the vanes of the valve member is performed using a lathe, it can be easily done, and the shaft receptacles of the valve member do not hinder such a machinery cutting operation. In addition, chamfering on the boundary areas defined by the shaft receptacles and the vanes can also be performed in the same manner.

When the circumferential edges of the vanes of the valve member are rounded by chamfering, damage to the pressure-contact sealing surfaces of the inside projecting ridge of the seating ring can be prevented even if the vanes are pressure pressed against the pressure-contact sealing surface of the seating ring.

DETAILED DESCRIPTION OF THE INVENTION

One embodiment of the present invention will be described below with reference to the accompanying drawings.

Figure 1:
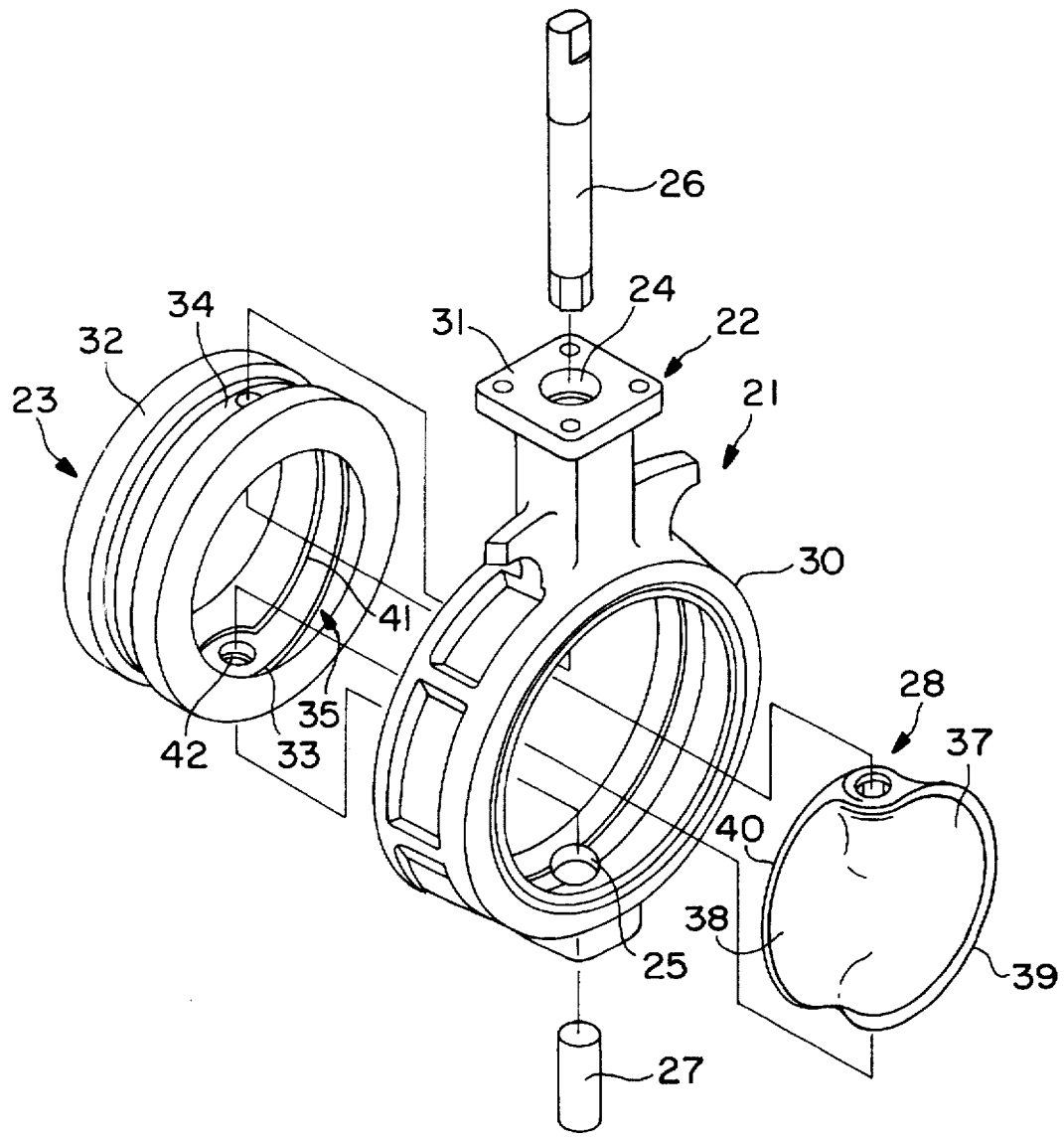
FIG. 1 is an exploded perspective view of one embodiment of the butterfly valve according to the present invention.

As shown in FIG 1, the butterfly valve 21 of the present invention is comprised of a main body 22, a seating ring 23 installed on the inside surface of the main body 22, a valve member 28 which is opened and closed by main and trailing valve shafts 26 and 27 which inserted into shaft holes 24 and 25 of the main body 22.

The main body 22, which is substantially a circular shape as a whole, consists of a ring-holding section 30 and an installation section 31. The ring-holding section 30 is for tightly holding the seating ring 23 on its inside circumferential surface. The installation section 31 is for rotatably holding the main valve shaft 26 and for installing a valve driving means (not shown) on its upper end surface. The valve driving means may be a lever, handle gear, air cylinder, motor, etc.

Figure 4:
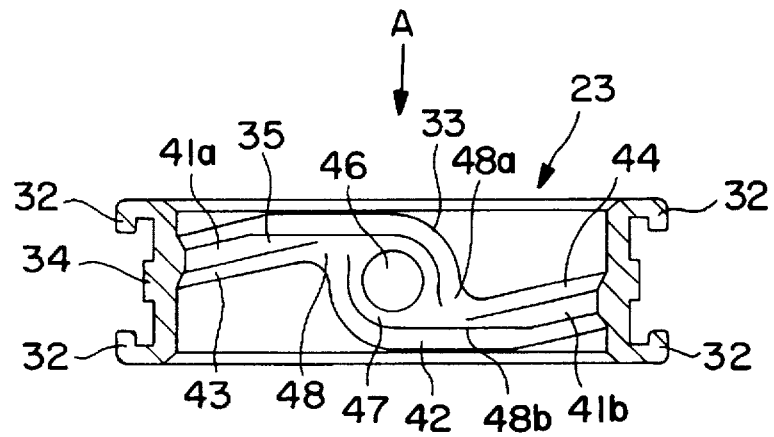
FIG. 4 is a horizontal cross section of the seating ring used in the embodiment of Figure !

As best seen from FIG. 4, two flanges 32 which engage the main body 22 are formed on the outside surface of the seating ring 23 so that they are located on the front and back with respect to the flow direction A of a fluid. In addition, a reinforcement rib 34 is formed between the flanges 32 for the entire outside surface of the seating ring except for shaft supporting portions 33.

Furthermore, a ring-form inside projecting ridge 35 which projects inwardly is formed on the inside surface of the seating ring 23. The inside projecting ridge 35 makes contact with the valve member 28 so as to block the fluid flow.

Figure 8:
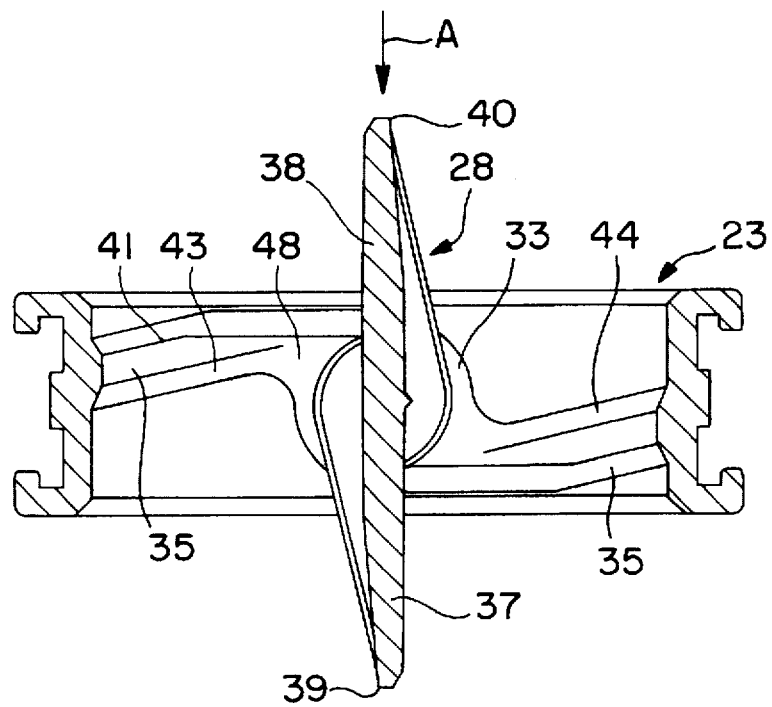
FIG. 8 is a horizontal cross section with the valve fully opened.

More specifically, as shown in FIGS. 4 and 8, the inside projecting ridge 35 includes vane-contact portions 41a and 41b and shaft supporting portion 33 (only the bottom shaft supporting portion is shown in the Figures). The vane-contact portions 41a and 41b respectively come into pressure-contact with front and rear circumferential edges 39 and 40 of the vane 37 and 38 of the valve member 28. The shaft supporting portion 33 presses against the end surface of a shaft receptacle 50 of the valve member 28 in the radial direction of the valve member 28.

As shown in FIG. 4, the vane-contact portions 41a and 41b are trapezoidal in cross section. Side edge 43 of the vane-contact portion 41a and side edge 44 of the vane-contact portion 41b are pressure-contact sealing surfaces.

More specifically, the pressure-contact sealing surface 43 of the vane-contact portion 41a which is shown on the right-hand side as viewed from the flow direction A of the fluid is located on the back (or downstream) side with respect to the flow direction A. The pressure-contact sealing surface 44 of the vane-contact portion 41b which is shown on the left-hand side as viewed from the flow direction A of the fluid is located on the front (or upstream) side with respect to the flow direction A.

The shaft supporting portion 33 is formed so that its outer circumferential edges are the same in height as the vane-contact portions 41a and 41b. A shaft hole 46 is opened in the center of the shaft supporting portion 33, and an indentation 47 having a form of spherical surface is provided around the shaft hole 46.

Figure 2:
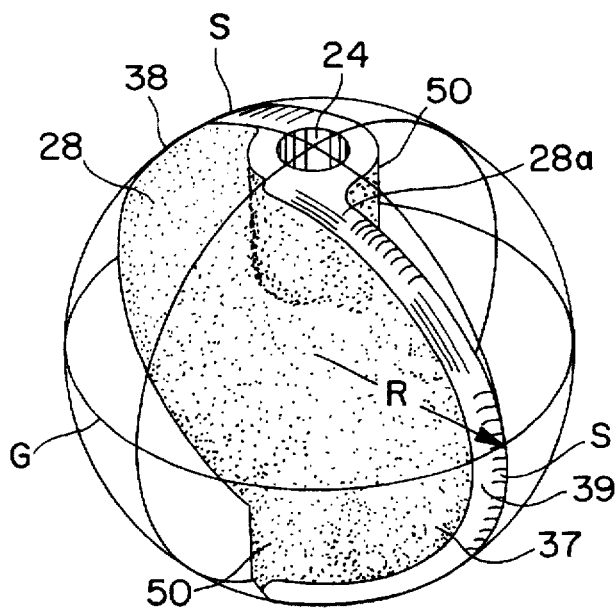
FIG. 2 is a perspective view of the valve used in the embodiment in FIG. 1.
Figure 3:
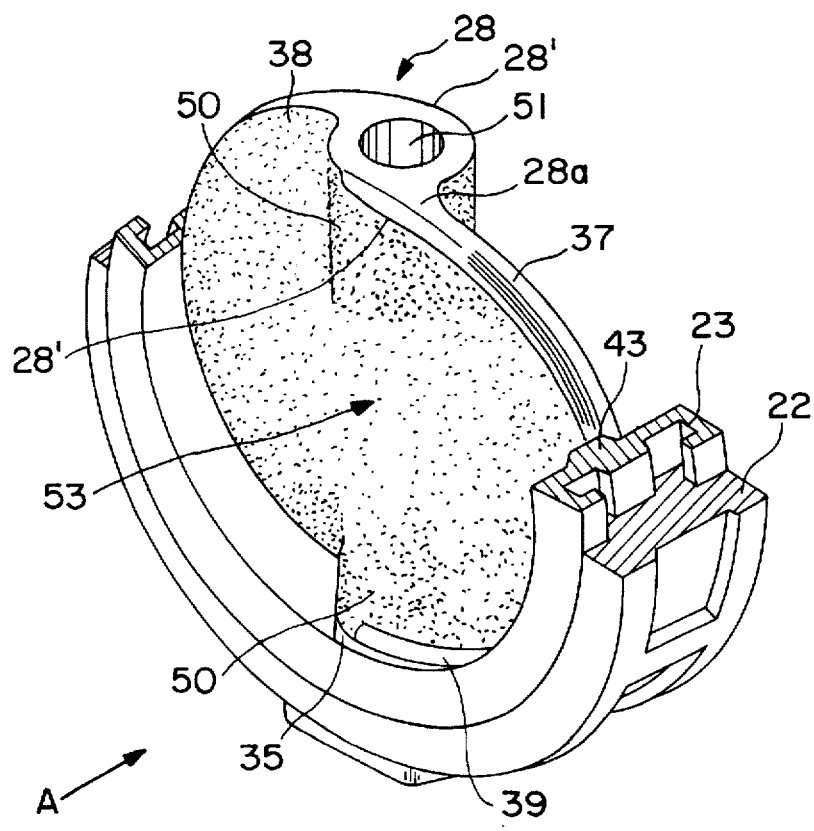
FIG. 3 is a cross-sectional perspective view of the butterfly valve.

The height of the boundary areas 48 which are located between the vane-contact portions 41a and 41b and the shaft supporting portion 33 is set so that it can allow easy ingress of the boundary areas 28a of the valve member 28 (see FIGS. 2 and 3). This is executed in order to secure a low torque rotation of the valve member 28 when the valve member 28, that has substantially a spherical outer circumferential surface, is opened and closed.

More specifically, in the inside projecting ridge 35 of the seating ring 23, the direction of pressing contact of the fluid differs at the vane-contact portions 41a and 41b and at the shaft supporting portion 33. At the vane-contact portions 41a and 41b, the pressing contact occurs in the direction of flow of the fluid. At the shaft supporting portion 33, the pressing contact occurs in the radial direction of the valve member. Accordingly, in order to secure an opening and closing rotation of the valve member 28 about the valve shafts 26 and 27 at a low torque, it is necessary to use an inside projecting ridge 35 that has the height which can allow the rotation of the valve member 28 in the boundary areas 48 defined by the vane-contact portions 41a and 41b and the shaft supporting portion 33.

Accordingly, in the boundary areas 48, the height of the side edges 48a located inside with respect to the direction of rotation of the valve member 28 is set at a value which allows the rotation of the valve member 28. Of course, sealing properties are also required in these boundary areas 48. Accordingly, at the portions of the inside projecting ridge that are located in the boundary areas 48, the height of the side edges 48b located outside with respect to the direction of rotation of the valve member 28 is set at the same height as that of the outer circumferential edges of the vane-contact portions 41a and 41b and of the shaft supporting portion 33.

As shown in FIG. 2, the valve member 28 is roughly a disk-form element with a radius of R. The valve member includes upper and lower shaft receptacles 50 formed separately so as to correspond to the main and trailing valve shafts 26 and 27. In addition, the valve member 20 includes vanes 37 and 38 located on both sides of the shaft receptacles 50.

The entire outer circumferential surface S of the valve member 28 is formed so that it has a spherical surface G of radial R of the disk-form valve member 28. In other words, the valve member 28 is, as a whole, in such a shape that the valve member is as if set inside a sphere of radial R.

Accordingly, when the central portion 53 of the valve member 28 is held on a main shaft of a lathe and the valve member 28 is rotated as a workpiece, the spherical-surface finishing of the outer circumferential surface of the valve member 28 can be performed continuously by the lathe.

Figure 5:
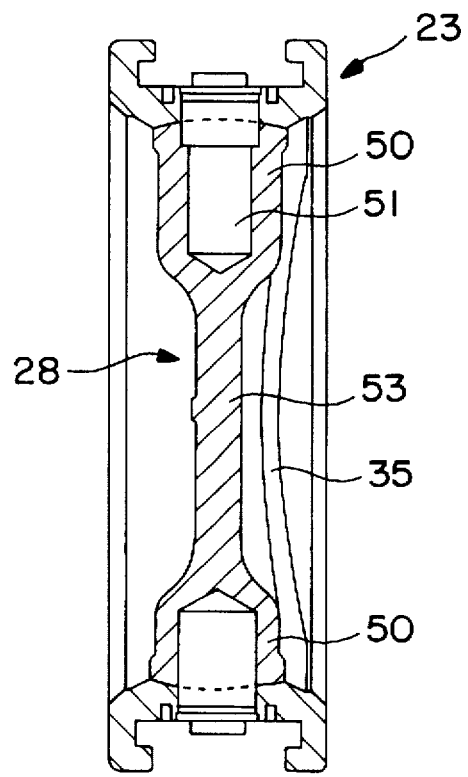
FIG. 5 is a longitudinal cross section of the central portion of the butterfly valve, the valve being fully closed.

As shown in FIG. 5, each one of the upper and lower shaft receptacles 50 has a shaft hole 51 inside. The central portion 53 of the valve member 28 that is located between the two shaft receptacles 50 is formed as a thin part in order to minimize the fluid resistance when the valve member 28 is fully opened during use.

Figure 6:
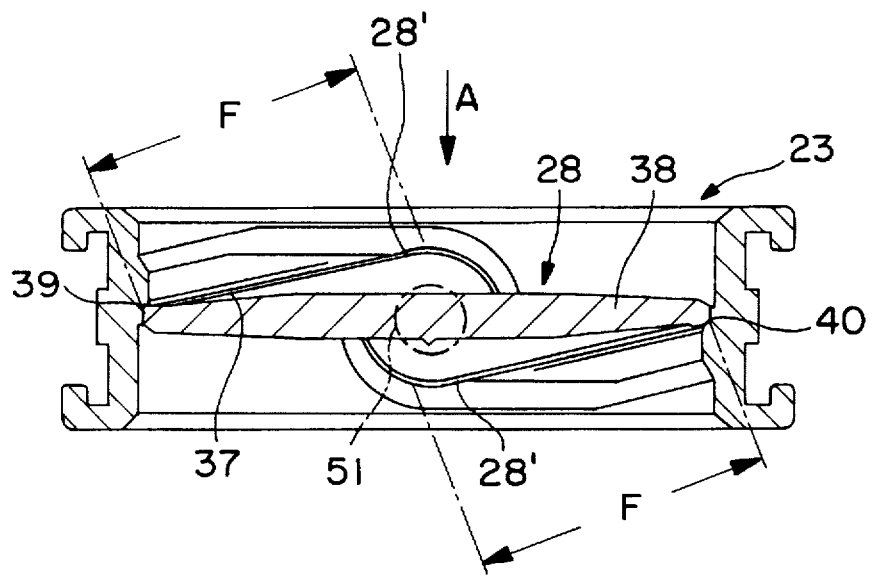
FIG. 6 is a horizontal cross section thereof.

FIG. 6 shows a horizontal cross section of the central portion of the valve member 28. As seen from FIG. 6, the vanes 37 and 38 are located at point-symmetrical positions with respect to the shaft holes 51 of the shaft receptacles 50. In addition, the vanes 37 and 38 extend tangentially as at 28 (also in FIG. 3) with respect to the outer circumferential surfaces of the shaft receptacles 50. In addition, portions of the circumferential edges 39 and 40 which come into pressure-contact with the pressure-contact sealing surfaces 43 and 44 of the seating ring 23 are formed flat and parallel to each other on the outer sides of the shaft receptacles 50.

Figure 9:
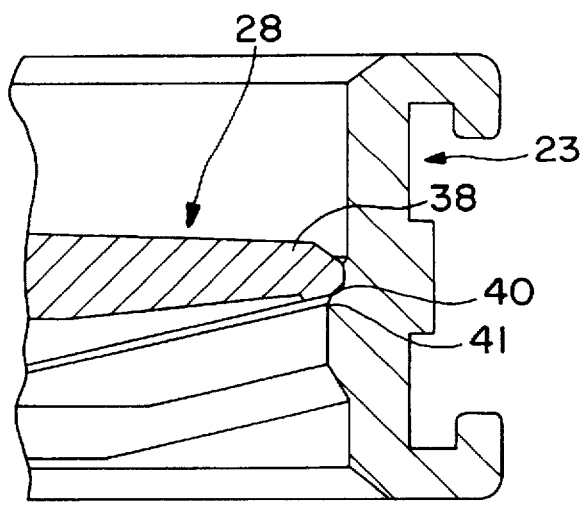
FIG. 9 is an enlarged cross section showing the valve fully closed.
Figure 10:
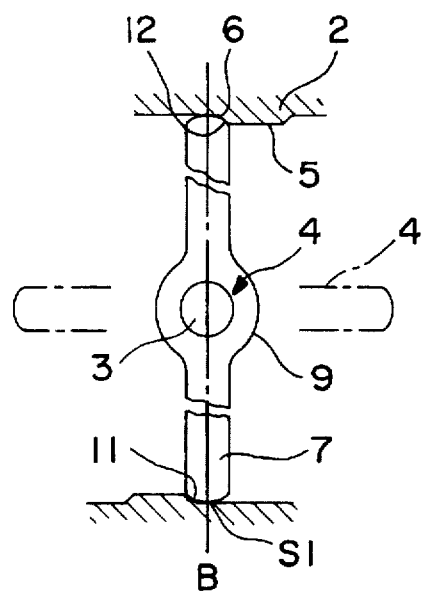
FIG. 10 is a simplified top view of the conventional butterfly valve.
Figure 11:
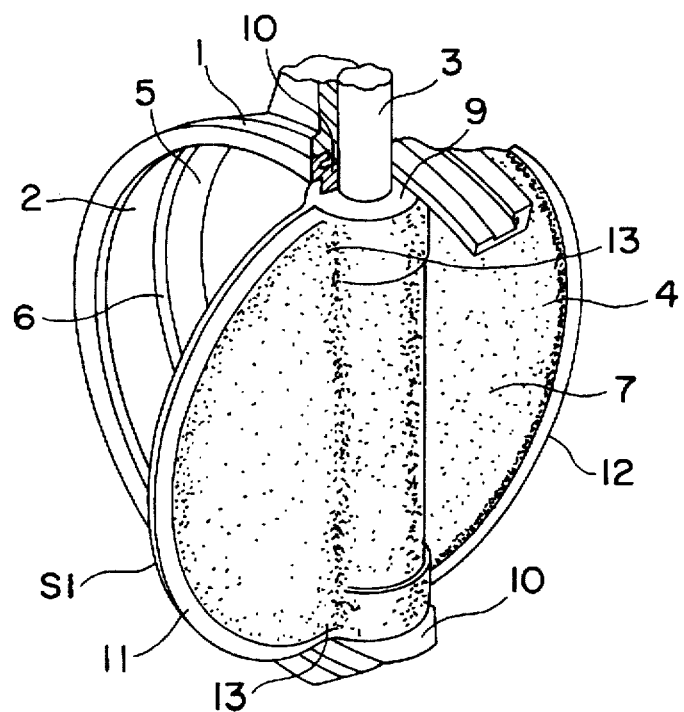
FIG. 11 is a perspective view of the conventional butterfly valve.

When the valve member 28 is fully closed as shown in FIGS. 6 and 9, the vane 37 on the right-hand side as viewed from the flow direction A of the fluid (i.e., the vane section 37 at the upper left in the Figures) is located further front (or upstream side) than the vane 38 on the left-hand side (i.e., the vane 38 at the upper right in the drawing). In addition, the front circumferential edge 39 of the right-hand vane 37 and the rear circumferential edge 40 of the left-hand vane 38 are formed flat and parallel to each other.

Accordingly, when the chamfering on the circumferential edges of the vanes 37 and 38 is performed using a lathe, the central portion 53 of the valve member 28 is aligned with the center of the main shaft of the lathe, and the valve member 28 is rotated to be cut. By processing like this, the circumferential edges 39 and 40 of the valve member 28 can easily be chamfered by a bite without any hindrance by the shaft receptacles 50. In addition, the chamfering on the boundary areas 28a which is between the shaft receptacles 50 and the vanes 37 and 38 can be performed at the same time. The range in which chamfering is performed is indicated by arrow F in FIG. 6.

As best seen in FIG. 9, the circumferential edges 39 and 40 (only the edge 40 is shown in FIG. 9) of the valve member 28 are chamfered so as to be rounded. With these rounded circumferential edges 39 and 40, damages to the pressure-contact sealing surfaces 43 and 44 of the seating ring 23 can be prevented.

Figure 7:
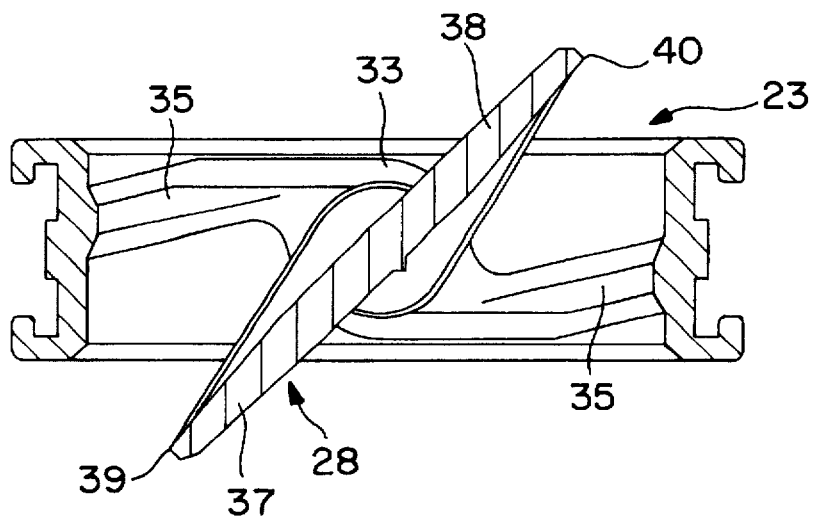
FIG. 7 is a horizontal cross section with the valve member opened.

With the above-described structure, when the valve member 28 is closed via the main valve shaft 26 rotated by the valve driving means such as a handle gear (not shown), the valve member 28 is rotated from the fully open state shown in FIG. 8, to the half-open state shown in FIG. 7 and then to the fully closed state shown in FIG. 6.

When fully closed, the vanes 37 and 38 of the valve member 28 are pressed against the side edges 43 and 44 of the inside projecting ridge 35 of the seating ring 23. Thus, the structure of the present invention is not that the seating ring 23 presses against the valve member 28 in the radial direction. Accordingly, deterioration of the inside projecting ridge 35 of the seating ring 23 is inhibited, and operability of the valve opening can be high.

In addition, the shaft receptacles 50 of the valve member 28 have spherical end surfaces as seen from FIG. 2, and the shaft supporting portions 33 of the seating ring 23 are formed as indentations (or formed to have a concave surface) which conform to the spherical end surfaces of the shaft receptacles 50. Accordingly, a large surface area of contact is secured between the end surfaces of the shaft receptacles 50 of the valve member 28 and the shaft supporting portions 33 of the seating ring 23, and the high sealing properties are obtained without increasing the height of the inside projecting ridge.

In addition, if the circumferential edges 39 and 40 of the valve member 28 are chamfered so as to be rounded, the seating ring 23 is not damaged, and the sealing properties can stay high.

As described in detail in the above, in the butterfly valve of the present invention, the side edges of the inside projecting ridge of the seating ring are used as pressure-contact sealing surfaces which are press-contacted to the front and rear circumferential edges of the vanes of the valve member. The outer circumferential surface of the roughly disk-form valve member is formed spherically as a whole. Accordingly, machinery cutting of the outer circumferential surface of the valve member can easily be accomplished using a lathe, etc. Moreover, since the shaft supporting portions of the seating ring which press against the valve member in the radial direction of the valve member are curved inwardly so as to correspond to the spherical shape of the valve member, high sealing properties can be secured.

Furthermore, the valve member is thin as a whole except for the shaft receptacles. Accordingly, fluid resistance when the valve member is opened can be minimized. In addition, the vanes of the valve member are provided so that they are at point-symmetrical positions with respect to the shaft receptacles and extend tangentially with respect to the front and back outer circumferential surfaces of the shaft receptacles. Accordingly, the chamfering with cutting machinery on such circumferential edges of the vanes can be performed easily. Furthermore, by shaping the circumferential edges of the valve member rounded, damage to the inside projecting ridge of the seating ring can be prevented.

We claim:

1. A butterfly valve consisting of a main body, a seating ring mounted on an inside surface of said main body, and a single valve member opened and closed via valve shafts that are passed through shaft holes formed in said main body, said seating ring being provided with an inside projecting ridge which projects from an inside surface of said seating ring, and side edges of said projecting ridge providing pressure-contact sealing surfaces with which front and rear circumferential edges of said valve member come into contact; wherein said valve member is formed substantially in a shape of a circular disk with an outer circumferential surface of said valve member formed as a spherical surface, said seating ring is provided with shaft supporting portions through which valve shafts for said valve member are inserted, said shaft supporting portions formed curved inwardly so as to conform with said spherical surfaces of said valve member, said circular disk further includes a shaft receptacle, and said circular disk is divided into left and right hand vanes provided respectively on left and right hand sides of said shaft receptacle such that said right hand vane is upstream of said left hand vane with said front circumferential edge of said right hand vane and the rear circumferential edge of said left hand vane formed flat and in parallel.

2. A butterfly valve according to claim 1, wherein said valve member is formed as a thin element except for cylindrical shaft receptacles into which said valve shafts are provided.

3. A butterfly valve according to claim 1, wherein said valve member is further provided with vanes provided on both sides of said shaft receptacles, said vanes being at point-symmetrical positions with respect to said shaft receptacles and extending tangentially with respect to front and back circumferential surfaces of said shaft receptacles, and circumferential edges of said vanes which contact with said sealing surfaces of said seating ring being chamfered.

4. A butterfly valve according to claim 2, wherein said valve member is further provided with vanes provided on both sides of said shaft receptacles, said vanes being at point-symmetrical positions with respect to said shaft receptacles and extending tangentially with respect to front and back circumferential surfaces of said shaft receptacles, and circumferential edges of said vanes which contact with said sealing surfaces of said seating ring being chamfered.

5. A butterfly valve according to claim 3, wherein circumferential edges of said vanes which contact said sealing surfaces of said seating ring are chamfered so that said circumferential edges are rounded.

6. A butterfly valve according to claim 4, wherein circumferential edges of said vanes which contact said sealing surfaces of said seating ring are chamfered so that said circumferential edges are rounded.

7. A butterfly valve consisting of:
   a circular main body with shaft holes;
   a seating ring installed in said main body, said seating ring being provided with an inside projecting ridge which projects from an inside surface of said seating ring, and said seating ring is further provided with shaft supporting portions having curved inwardly surfaces; and
   a single substantially disk-form valve member with shaft receptacles, said valve member being opened and closed via valve shafts that are inserted in said shaft holes of said main body, in said shaft supporting portions of said seating ring and in said shaft receptacles of said valve member, a circumference of said valve member having a spherical surface that conforms to said curved inwardly surfaces of said shaft supporting portions of said seating ring and circumferential edges of front and rear sides of said valve member coming into contact with said inside projecting ridge when said valve member is closed; and wherein said circular disk is divided into left and right hand vanes provided respectively on left and right hand sides of the shaft receptacle such that said right hand vane is upstream of said left hand vane with said front circumferential edge of said right hand vane and said rear circumferential edge of said left hand vane formed flat and in parallel.

8. A butterfly valve according to claim 7, wherein said circumferential edges of said vanes of said valve member have rounded surfaces.

* * * * *